(12) United States Patent
Gueron et al.

(10) Patent No.: US 10,560,259 B2
(45) Date of Patent: *Feb. 11, 2020

(54) ARCHITECTURE AND INSTRUCTION SET FOR IMPLEMENTING ADVANCED ENCRYPTION STANDARD (AES)

(71) Applicant: INTEL CORPORATION, Santa Clara, CA (US)

(72) Inventors: Shay Gueron, Haifa (IL); Wajdi K. Feghali, Boston, MA (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,969

(22) Filed: Jun. 30, 2017

(65) Prior Publication Data

US 2017/0310467 A1    Oct. 26, 2017

Related U.S. Application Data

(63) Continuation of application No. 14/947,944, filed on Nov. 20, 2015, which is a continuation of application (Continued)

(51) Int. Cl.
*H04L 9/06* (2006.01)
*H04L 9/14* (2006.01)
*G06F 21/60* (2013.01)

(52) U.S. Cl.
CPC .......... *H04L 9/0631* (2013.01); *G06F 21/602* (2013.01); *H04L 9/14* (2013.01); *H04L 2209/24* (2013.01)

(58) Field of Classification Search
CPC ........ H04L 9/0631; H04L 9/14; G06F 21/602
(Continued)

(56) References Cited

U.S. PATENT DOCUMENTS

| 5,727,062 A | 3/1998 | Ritter |
| 5,781,758 A | 7/1998 | Morley |

(Continued)

FOREIGN PATENT DOCUMENTS

| KR | 10-2002-0061718 A | 7/2002 |
| WO | 03/019357 A1 | 3/2003 |
| WO | 2008/083365 A1 | 7/2008 |

OTHER PUBLICATIONS

United States National Institute of Standards and Technology (NIST), "Announcing the Advanced Encryption Standard (AES)", FIPS Publication 197, United States National Institute of Standards and Technology (NIST), Nov. 26, 2001, entire document, https://csrc.nist.gov/csrc/media/publications/fips/197/final/documents/fips-197.pdf.*

(Continued)

*Primary Examiner* — Jahangir Kabir
(74) *Attorney, Agent, or Firm* — Nicholson De Vos Webster & Elliott LLP

(57) ABSTRACT

A flexible aes instruction for a general purpose processor is provided that performs aes encryption or decryption using n rounds, where n includes the standard aes set of rounds {10, 12, 14}. A parameter is provided to allow the type of aes round to be selected, that is, whether it is a "last round". In addition to standard aes, the flexible aes instruction allows an AES-like cipher with 20 rounds to be specified or a "one round" pass.

18 Claims, 5 Drawing Sheets

Related U.S. Application Data

No. 14/100,970, filed on Dec. 9, 2013, now Pat. No. 9,230,120, which is a continuation of application No. 13/088,088, filed on Apr. 15, 2011, now Pat. No. 8,634,550, which is a continuation of application No. 11/648,434, filed on Dec. 28, 2006, now Pat. No. 7,949,130.

(58) Field of Classification Search
USPC .......................................................... 380/28
See application file for complete search history.

(56) References Cited

U.S. PATENT DOCUMENTS

| | | | |
|---|---|---|---|
| 6,028,939 | A | 2/2000 | Yin |
| 6,112,019 | A | 8/2000 | Chamdani |
| 6,192,129 | B1 | 2/2001 | Coppersmith et al. |
| 6,937,727 | B2 | 8/2005 | Yup et al. |
| 7,055,039 | B2 | 5/2006 | Chavanne et al. |
| 7,106,860 | B1 | 9/2006 | Yu et al. |
| 7,107,459 | B2 | 9/2006 | Caronni et al. |
| 7,221,763 | B2 | 5/2007 | Verbauwhede |
| 7,257,229 | B1 | 8/2007 | Leshem |
| 7,260,217 | B1 | 8/2007 | Carlson |
| 7,295,671 | B2 | 11/2007 | Snell |
| 7,392,399 | B2 | 6/2008 | Grohoski et al. |
| 7,502,943 | B2 | 3/2009 | Henry et al. |
| 7,532,722 | B2 | 5/2009 | Crispin et al. |
| 7,536,560 | B2 | 5/2009 | Henry et al. |
| 7,570,760 | B1* | 8/2009 | Olson .................. H04L 9/0637 380/28 |
| 7,606,365 | B2 | 10/2009 | Noh et al. |
| 7,620,821 | B1* | 11/2009 | Grohoski .............. G06F 9/3851 380/1 |
| 7,685,354 | B1* | 3/2010 | Hetherington ........ G06F 12/084 711/163 |
| 7,694,156 | B2 | 4/2010 | Gammel et al. |
| 7,734,043 | B1 | 6/2010 | Jefferson et al. |
| 7,746,350 | B1 | 6/2010 | Danilak |
| 7,783,037 | B1 | 8/2010 | Bong |
| 7,801,301 | B2 | 9/2010 | Macchetti et al. |
| 7,809,132 | B2 | 10/2010 | Nadehara |
| 7,831,039 | B2 | 11/2010 | Bertoni et al. |
| 7,949,130 | B2 | 5/2011 | Gueron et al. |
| 8,020,006 | B2 | 9/2011 | Leung, Jr. |
| 8,054,967 | B2 | 11/2011 | Nonaka et al. |
| 8,069,350 | B2 | 11/2011 | Nowottnick |
| 8,634,550 | B2 | 1/2014 | Gueron et al. |
| 8,817,979 | B2 | 8/2014 | Chu et al. |
| 9,230,120 | B2 | 1/2016 | Gueron et al. |
| 2001/0018736 | A1* | 8/2001 | Hashimoto .............. G06F 21/10 713/1 |
| 2002/0191784 | A1 | 12/2002 | Yup et al. |
| 2002/0191790 | A1 | 12/2002 | Anand et al. |
| 2003/0039355 | A1 | 2/2003 | McCanny et al. |
| 2003/0048903 | A1 | 3/2003 | Ito et al. |
| 2003/0059054 | A1 | 3/2003 | Hu et al. |
| 2003/0091184 | A1 | 5/2003 | Chui |
| 2003/0108195 | A1 | 6/2003 | Okada et al. |
| 2003/0108196 | A1 | 6/2003 | Kirichenko |
| 2003/0133568 | A1 | 7/2003 | Stein et al. |
| 2003/0142818 | A1 | 7/2003 | Raghunathan et al. |
| 2003/0198345 | A1 | 10/2003 | Van Buer et al. |
| 2003/0212727 | A1* | 11/2003 | Macy ...................... G06F 7/722 708/620 |
| 2003/0223580 | A1 | 12/2003 | Snell |
| 2003/0226052 | A1 | 12/2003 | Hill |
| 2004/0047466 | A1 | 3/2004 | Feldman et al. |
| 2004/0103218 | A1 | 5/2004 | Blumrich et al. |
| 2004/0120518 | A1 | 6/2004 | Macy et al. |
| 2004/0184602 | A1* | 9/2004 | Nadehara .............. H04L 9/0631 380/28 |
| 2004/0202317 | A1* | 10/2004 | Dennjanenko ........ H04L 9/0631 380/28 |
| 2004/0202318 | A1 | 10/2004 | Lu |
| 2004/0202319 | A1 | 10/2004 | Hussain et al. |
| 2004/0208072 | A1 | 10/2004 | Henry et al. |
| 2004/0208314 | A1 | 10/2004 | Patariu et al. |
| 2004/0250091 | A1* | 12/2004 | Henry .................. G06F 9/30003 713/189 |
| 2005/0033831 | A1* | 2/2005 | Rashid .................... H04L 49/00 709/220 |
| 2005/0053232 | A1 | 3/2005 | Bace |
| 2005/0132226 | A1 | 6/2005 | Wheeler et al. |
| 2005/0147239 | A1 | 7/2005 | Chin et al. |
| 2005/0169463 | A1 | 8/2005 | Ahn et al. |
| 2005/0175175 | A1 | 8/2005 | Leech |
| 2005/0207571 | A1 | 9/2005 | Ahn et al. |
| 2005/0213756 | A1 | 9/2005 | Hubert |
| 2006/0002549 | A1 | 1/2006 | Avasarala et al. |
| 2006/0005051 | A1 | 1/2006 | Golla et al. |
| 2006/0015754 | A1* | 1/2006 | Drehmel ................ G06F 21/72 713/193 |
| 2006/0018477 | A1 | 1/2006 | Jalfon et al. |
| 2006/0023877 | A1 | 2/2006 | Tsuruga |
| 2006/0050887 | A1 | 3/2006 | Chen |
| 2006/0059314 | A1* | 3/2006 | Bouchard ............. G06F 9/3824 711/138 |
| 2006/0069872 | A1 | 3/2006 | Bouchard et al. |
| 2006/0072746 | A1 | 4/2006 | Tadepalli |
| 2006/0112213 | A1* | 5/2006 | Suzuoki .................. G06F 21/72 711/100 |
| 2006/0120527 | A1 | 6/2006 | Baek |
| 2006/0126835 | A1 | 6/2006 | Kim et al. |
| 2006/0147040 | A1 | 7/2006 | Lee et al. |
| 2006/0188098 | A1* | 8/2006 | Kumagai .............. H04L 9/0637 380/239 |
| 2006/0194386 | A1 | 8/2006 | Yao et al. |
| 2007/0014395 | A1 | 1/2007 | Joshi et al. |
| 2007/0083735 | A1 | 4/2007 | Glew |
| 2007/0098153 | A1 | 5/2007 | Nishikawa |
| 2007/0098155 | A1 | 5/2007 | Nagasawa et al. |
| 2007/0110225 | A1 | 5/2007 | Leventhal et al. |
| 2007/0183594 | A1 | 5/2007 | Russell |
| 2007/0189522 | A1 | 8/2007 | Raju et al. |
| 2007/0189536 | A1 | 8/2007 | Gammel et al. |
| 2007/0237324 | A1* | 10/2007 | Ferguson ............. G06F 9/30029 380/28 |
| 2007/0260823 | A1* | 11/2007 | Dickinson ........... G06F 11/2242 711/153 |
| 2007/0294496 | A1* | 12/2007 | Goss .................... G06F 12/1408 711/163 |
| 2008/0019504 | A1 | 1/2008 | Han et al. |
| 2008/0062803 | A1* | 3/2008 | Fronte ..................... G06F 21/72 365/230.03 |
| 2008/0069339 | A1 | 3/2008 | Parveen et al. |
| 2008/0240426 | A1 | 10/2008 | Gueron et al. |
| 2017/0310470 | A1 | 10/2017 | Gueron et al. |

OTHER PUBLICATIONS

Non-Final Office Action received for U.S. Appl. No. 11/648,434, dated Jul. 30, 2010, 20 pages.
Notice of Allowance received for U.S. Appl. No. 11/648,434, dated Jan. 26, 2011, 12 pages.
Final Office Action received for U.S. Appl. No. 13/088,088, dated Sep. 24, 2012, 24 pages.
Non-Final Office Action received for U.S. Appl. No. 13/088,088, dated Jun. 4, 2013, 31 pages.
Non-Final Office Action received for U.S. Appl. No. 13/088,088, dated May 9, 2012, 18 pages.
Notice of Allowance received for U.S. Appl. No. 13/088,088, dated Sep. 20, 2013, 14 pages.
Final Office Action received for U.S. Appl. No. 14/100,970 dated Dec. 3, 2014, 23 pages.
Non-Final Office Action received for U.S. Appl. No. 14/100,970 dated Apr. 21, 2015, 24 pages.
Non-Final Office Action received for U.S. Appl. No. 14/100,970 dated Jul. 18, 2014, 26 pages.
Notice of Allowance received for U.S. Appl. No. 14/100,970 dated Sep. 2, 2015, 14 pages.

(56) References Cited

OTHER PUBLICATIONS

Final Office Action received for U.S. Appl. No. 14/947,944, dated May 11, 2017, 29 pages.
Non-Final Office Action received for U.S. Appl. No. 14/947,944, dated Jul. 25, 2016, 20 pages.
International Preliminary Report on Patentability received for PCT Patent Application No. PCT/US2007/089175, dated Jul. 9, 2009, 6 pages.
International Search Report and Written Opinion received for PCT Patent Application No. PCT/US2007/089175, dated Jun. 5, 2008, 10 pages.
Grabher, et al., "An Exploration of Mechanisms for Dynamic Cryptographic Instruction Set Extension", CHES 2011, LNCS 6917, International Association for Cryptologic Research, 2011, pp. 1-16.
Lu, et al., "Integrated Design of AES (Advanced Encryption Standard) Encrypter and Decrypter", Proceedings of the IEEE International Conference on Application-Specific Systems, Architectures, and Processors (ASAP'02) 1063-6862/02, 2002, 9 pages.
Tillich, et al., "Accelerating AES Using Instruction Set Extensions for Elliptic Curve Cryptography", ICCSA 2005, LNCS 3481, 2005, pp. 665-675.
Tillich, et al., "An Instruction Set Extension for Fast and Memory-Efficient Aes Implementation", International Federation for Information Processing 2005, CMS 2005, LNCS 3677, 2005, pp. 11-21.
Rouse, Margaret, "State Machine", Tech Target, Retrieved from "http://whatis.techtarget.com/definition/state-machine" on May 2, 2017, 4 pages.
Advisory Action from U.S. Appl. No. 15/639,946, dated Feb. 26, 2019, 3 pages.
Amendment after Notice of Allowance for U.S. Appl. No. 13/088,088, dated Dec. 6, 2013, 8 pages.
Final Office Action from U.S. Appl. No. 15/639,974, dated Nov. 6, 2018, 48 pages.
Final Office Action from U.S. Appl. No. 15/639,983, dated Nov. 6, 2018, 50 pages.
Final Office Action from U.S. Appl. No. 15/639,991, dated Feb. 14, 2019, 46 pages.
Final Office Action from U.S. Appl. No. 15/639,999, dated Feb. 14, 2019, 55 pages.
Final Office Action from U.S. Appl. No. 14/947,944, dated Oct. 22, 2018, 48 pages.
Final Office Action from U.S. Appl. No. 15/639,936, dated Jul. 12, 2018, 32 pages.
Final Office Action from U.S. Appl. No. 15/639,941, dated Oct. 24, 2018, 43 pages.
Final Office Action from U.S. Appl. No. 15/639,964, dated Oct. 25, 2018, 41 pages.
Final Office Action from U.S. Appl. No. 15/639,926, dated Jul. 6, 2018, 41 pages.
Final Office Action from U.S. Appl. No. 15/639,946, dated Aug. 27, 2018, 43 pages.
Non-Final Office Action from U.S. Appl. No. 15/639,936, dated Feb. 5, 2019, 47 pages.
Non-Final Office Action from U.S. Appl. No. 14/947,944, dated Dec. 14, 2017, 37 pages.
Non-Final Office Action from U.S. Appl. No. 15/639,926, dated Jan. 25, 2019, 41 pages.
Non-Final Office Action from U.S. Appl. No. 15/639,926, dated Nov. 30, 2017, 14 pages.
Non-Final Office Action from U.S. Appl. No. 15/639,936, dated Dec. 13, 2017, 26 pages.
Non-Final Office Action from U.S. Appl. No. 15/639,941, dated Jan. 26, 2018, 30 pages.
Non-Final Office Action from U.S. Appl. No. 15/639,946, dated Feb. 7, 2018, 30 pages.
Non-Final Office Action from U.S. Appl. No. 15/639,964, dated Feb. 23, 2018, 30 pages.
Non-Final Office Action from U.S. Appl. No. 15/639,974, dated Apr. 6, 2018, 30 pages.
Non-Final Office Action from U.S. Appl. No. 15/639,983, dated Apr. 20, 2018, 28 pages.
Non-Final Office Action from U.S. Appl. No. 15/639,991, dated Jul. 20, 2018, 33 pages.
Non-Final Office Action from U.S. Appl. No. 15/639,999, dated Aug. 9, 2018, 33 pages.
Office Action Response for U.S. Appl. No. 11/648,434, filed Oct. 29, 2010, 9 pages.
Response to Office Action received for U.S. Appl. No. 13/088,088, filed Jul. 12, 2012, 8 pages.
Response to Office Action received for U.S. Appl. No. 13/088,088, filed Jul. 19, 2013, 12 pages.
Response to Office Action received for U.S. Appl. No. 13/088,088, filed Nov. 27, 2012, 14 pages.
Non-Final Office Action from U.S. Appl. No. 14/984,637, dated Jan. 15, 2019, 38 pages.
Tensilica Inc., "Implementing the Advanced Encryption Standard on Xtensa Processors [online]," searched on Dec. 15, 2011, The internet URL: http://www.tensilica.com/uploads/pdf/AES_appnote.pdf, Nov. 2005, 77 pages.
NIST., "Specification for the Advanced Encryption Standard (AES)," Federal Information Processing Standards Publication 197, Nov. 26, 2001, 51 Pages.
Bertoni G.M et al., "Speeding Up AES Extending a 32bit Processor Instruction Set," International Conference on Application-specific Systems, Architectures and Processors, 2006, 6 pages.
Atsushi Oshima, "Close up a core micro architecture", IT Media, Feb. 1, 2007, 18 pages., The Internet URL: http://www.itmedia.co.jp/pcuser/articles/0701/24/news002.html.
Kiningham K., et al., "Cipher Implementation for CESEL," Stanford University, Retrieved from the Internet https://crypto.stanford.edu/cs359c/17sp/projects/KevinKininghamMauriceShih.pdf, 2016, pp. 1-5.
Notice of Allowance from U.S. Appl. No. 15/639,941, dated May 2, 2019, 24 pages.
Notice of Allowance from U.S. Appl. No. 15/639,946, dated Apr. 25, 2019, 20 pages.
Notice of Allowance from U.S. Appl. No. 15/639,974, dated Apr. 26, 2019, 15 pages.
Notice of Allowance from U.S. Appl. No. 15/639,983, dated Apr. 25, 2019, 12 pages.
Yu J., et al., "Vector Processing as a Soft-core CPU Accelerator," FPGA '08, Retrieved from the Internet www.ece.ubc.ca/~jasony/research/fpga2008-yu.pdf, Monterey, California, USA, ACM 978-1-59593-934-0/08/02, Feb. 24-26, 2008, 10 pages.
Advisory Action from U.S. Appl. No. 15/639,991, dated Aug. 6, 2019, 3 pages.
Advisory Action from U.S. Appl. No. 15/639,999, dated Jul. 31, 2019, 3 pages.
Notice of Allowance from U.S. Appl. No. 15/639,941, dated Aug. 26, 2019, 4 pages.
Notice of Allowance received for U.S. Appl. No. 14/947,944, dated Sep. 25, 2019, 11 pages.
Notice of Allowance received for U.S. Appl. No. 15/639,926, dated Oct. 8, 2019, 11 pages.
Notice of Allowance received for U.S. Appl. No. 15/639,936, dated Oct. 9, 2019, 10 pages.
Notice of Allowance received for U.S. Appl. No. 15/639,946, dated Nov. 12, 2019, 9 pages.
Notice of Allowance received for U.S. Appl. No. 15/639,964, dated Sep. 25, 2019, 11 pages.
Notice of Allowance received for U.S. Appl. No. 15/639,974, dated Nov. 14, 2019, 9 pages.
Notice of Allowance received for U.S. Appl. No. 15/639,991, dated Nov. 14, 2019, 11 pages.
Notice of Allowance received for U.S. Appl. No. 15/639,999, dated Nov. 12, 2019, 11 pages.
Notice of Allowance, U.S. Appl. No. 15/639,983, dated Nov. 12, 2019, 9 pages.

* cited by examiner

ARCHITECTURE AND INSTRUCTION SET FOR IMPLEMENTING ADVANCED ENCRYPTION STANDARD (AES)

CROSS-REFERENCE TO RELATED APPLICATIONS

This application is a continuation of prior U.S. patent application Ser. No. 14/947,944, filed on Nov. 20, 2015, which is a continuation of prior U.S. patent application Ser. No. 14/100,970, filed on Dec. 9, 2013, now U.S. Pat. No. 9,230,120, which is a continuation of prior U.S. patent application Ser. No. 13/088,088, filed on Apr. 15, 2011, now U.S. Pat. No. 8,634,550, which is a continuation of prior U.S. patent application Ser. No. 11/648,434, filed on Dec. 28, 2006, now U.S. Pat. No. 7,949,130, which is hereby incorporated herein by reference in its entirety and for all purposes.

FIELD

This disclosure relates to cryptographic algorithms and in particular to the advanced encryption standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transforms intelligible data referred to as "plaintext" into an unintelligible form referred to as "cipher text". The transformations in the cipher include (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

An embodiment of the invention provides an instruction set extension for performing AES encryption and decryption in a general purpose processor.

Figure 1:
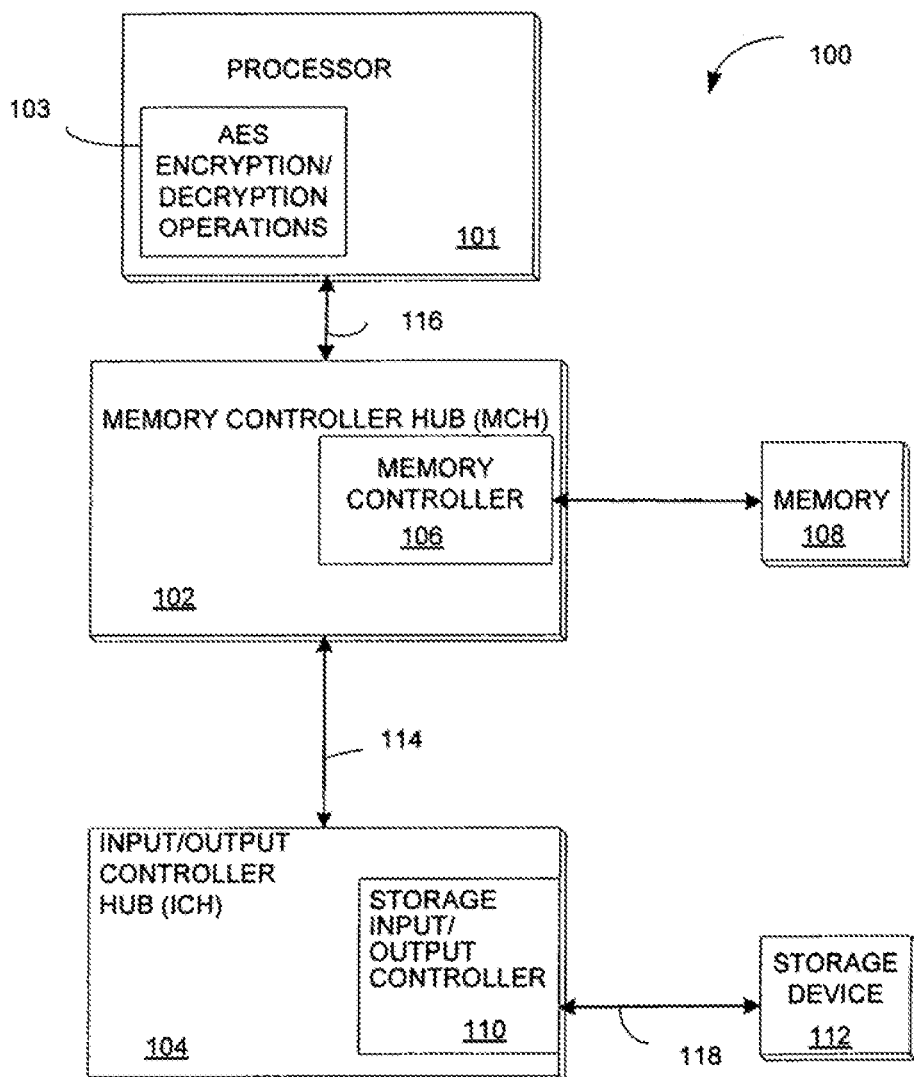
FIG. 1 is a block diagram of a system that includes an embodiment of an instruction set extension for performing AES encryption and decryption in a general purpose processor according to the principles of the present invention.

FIG. 1 is a block diagram of a system 100 that includes an embodiment of an instruction set extension for performing AES encryption and decryption in a general purpose processor according to the principles of the present invention. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

The processor 101 includes an AES function 103 to perform aes encryption and decryption operations. The AES function 103 may be used to encrypt or decrypt information stored in memory 108 and/or stored in the storage device 112.

Figure 2:
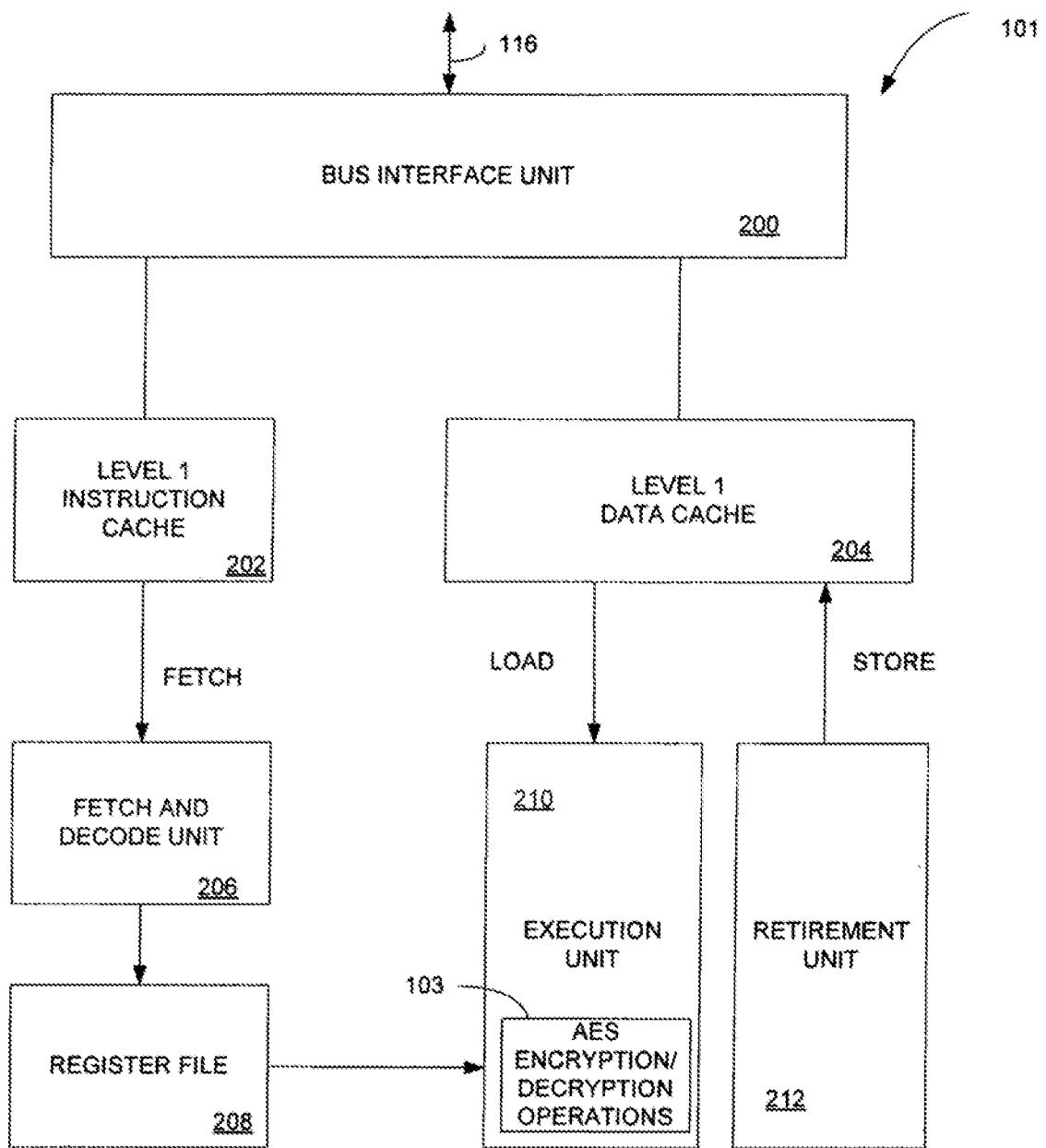
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from Level 1 (L1) instruction cache 202. Data to be used for executing the instruction may be stored in register file 208. In one embodiment, the register file 208 includes a plurality of 128-bit registers, which are used by an aes instruction to store data for use by the aes instruction.

In one embodiment, the register file is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks which may be loaded at one time. Instructions may be applied to a 128-bit block (16 bytes) in one operation.

The fetch and decode unit 206 fetches macroinstructions from L1 instruction cache 202, decodes the macroinstructions and breaks them into simple operations called micro operations (μops). The execution unit 210 schedules and executes the micro operations. In the embodiment shown, the aes function 103 in the execution unit 210 includes micro operations for the aes instruction. The retirement unit 212 writes the results of the executed instructions to registers or memory.

Figure 3:
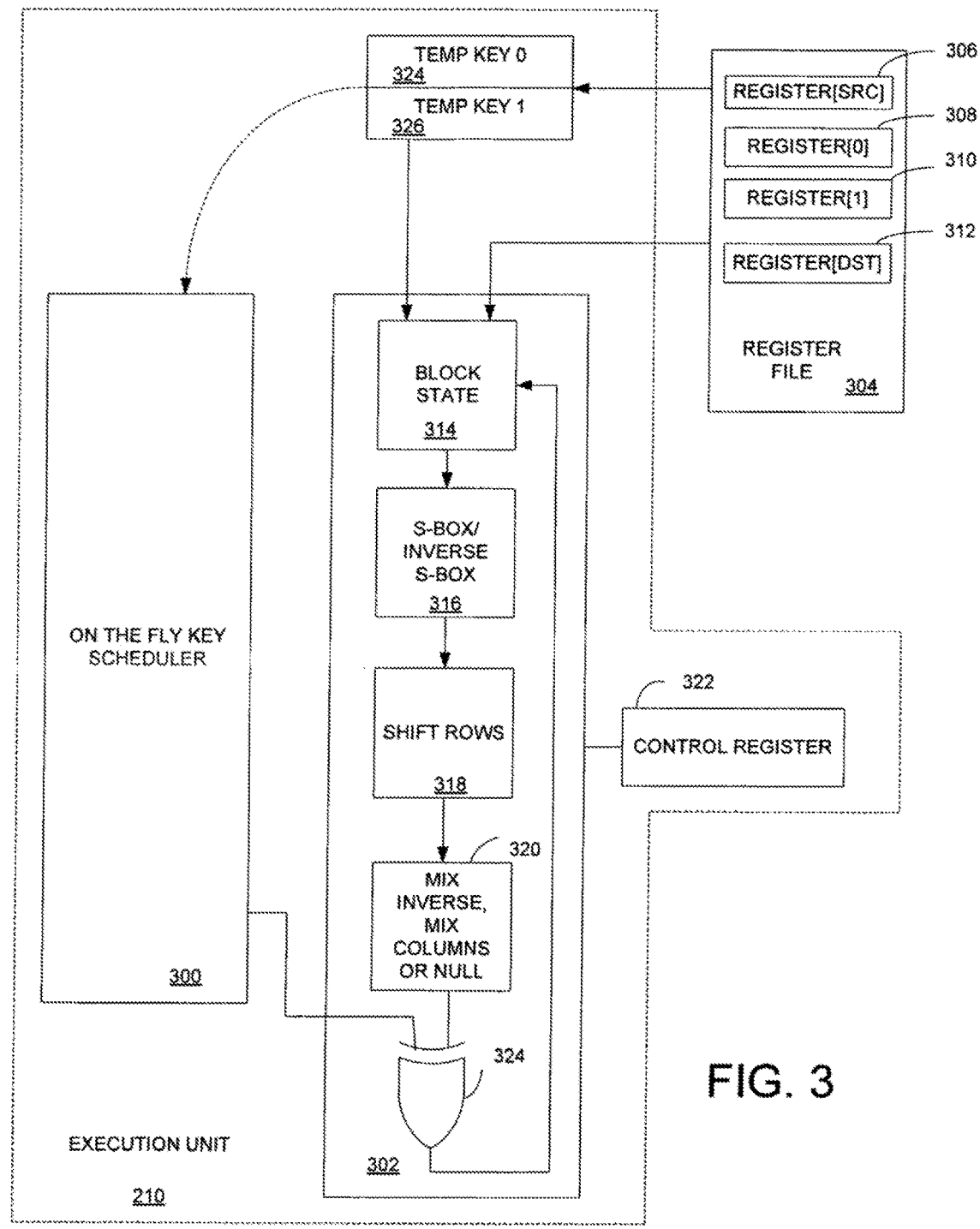
FIG. 3 is a block diagram illustrating an embodiment of an execution 210 shown in FIG. 2 for performing AES encryption and decryption according to the principles of the present invention.

FIG. 3 is a block diagram illustrating an embodiment of an execution unit 210 shown in FIG. 2 for performing AES encryption and decryption according to the principles of the present invention.

After an aes instruction has been decoded by the fetch and decode unit 206, the execution of the aes instruction by the execution unit 210 involves performing the micro operations associated with the aes instruction.

An AES instruction (macro instruction) to perform AES encryption or decryption in the AES logic may be defined symbolically as:

```
REG[dest] = aes(REG[src],
        key-size={128, 192, 256},
        #rounds={1,10,12,14},
        op={encrypt/decrypt},
        special_last_round={true/false} )
```

The register file 304 has a plurality of 128-bit registers which may be used by the AES instruction. One of the 128-bit registers stores a source operand for the first aes round and another one of the 128-bit registers stores the result of the aes instruction. The source operation is transformed in a number of rounds (1, 10, 12 or 14) to provide a result which is stored in another register in the register file 304. The source operand may be 128-bit of plaintext to be encrypted using the key or 128-bits of cipher text to be decrypted using the key.

Information to be encrypted or decrypted by the aes instruction is loaded into a source register 306 in the register file 304 prior to issuing the aes instruction. The key to be used to encrypt/decrypt the information in the source register 306 is stored in one or more registers in the register file. In the case of a 128-bit key, the entire 128-bits of the key are stored in one of the 128-bit registers in the register file 304, for example, register 308. For key sizes greater than 128 bits, the most significant bits (greater than 128 bits) are stored in another 128-bit register, for example, register 310. The key size parameter for the aes instruction indicates whether the key is stored in one register or more than one register.

In one embodiment, register[0] 308 in the register file 308 is used to store the least significant 128-bits of the key and register[1] 310 is used to store the most significant bits of a key size that is greater than 128-bits. The one or more registers in the register file 304 that store the key are not modified during the execution of the aes instruction.

The key stored the register file is loaded into one or more of the temporary key registers. In an embodiment in which each temporary key register has 128-bits, 128-bits of the key are stored in a first temporary key register 324 and the upper bits of the key greater than 128-bits are stored in a second 128-bit temporary key register 326. Thus, a 256-bit key may be stored between the two temporary registers with the least significant 128-bits stored in one of the temporary key registers, for example, Temp Key 0 324 and the most significant 128-bits stored in the other 128-bit temporary key register, for example, temp key 1 326.

AES has a fixed block size of 128 bits and a key size of 128, 192 or 256 bits and operates on a 4×4 array of bytes (that is, 16 bytes (128-bit fixed block size)), which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits).

The execution unit 210 retrieves the source operand and the key which are stored in the register file 304 prior to performing encryption or decryption using the micro operations for the aes instruction. In the embodiment shown, the source operand (128-bit block state) is stored in register 306 and the key is stored in register(s) 308, 310 in the register file 304. After the execution of the aes instruction is complete, the result is stored in register 312 in the register file 304.

The execution unit 210 includes two 128-bit temporary key registers 324, 326 to temporarily store the key. The key is loaded into one or both temporary key registers 324, 326 from one or both registers 308, 310 in the register file 304 dependent on the length of the key.

In order to reduce the memory required for storing the expanded key associated with the key, the execution unit 210 includes an on-the-fly key scheduler 300 that generates the portion of the expanded key (round key) that is used in the current round. The on-the-fly key scheduler 300 expands the n-bytes of a key into b-bytes of an expanded key with the first n-bytes of the expanded key being the original key. For example, for a 128-bit key, the 128-bit key is expanded into a 176-bytes expanded key, that is, 11×16-bytes, with the first 16-bytes being the original 128-bit key, and thus the number of rounds is 10. The 24 bytes of a 192-bit key are expanded into 208 bytes (13×16 bytes) to provide 12 "round keys" one for each of the 12 rounds and the 32 bytes of a 256-bit key are expanded into 240 bytes (15×16 bytes) to provide 14 "round keys" one for each of the 14 rounds. Instead of pre-generating the expanded key and storing it in a table, the on-the-fly key scheduler 300 generates the "round key" on-the-fly, that is, as it is needed for the next aes round.

Upon decoding an aes instruction, a number of parameters to be used to control the flow in each aes round are stored in a control register 232. The parameters include the size of the key, number of rounds, the type of operation and whether there is a special last round. The size of the key may be 128-bits, 192-bits or 256-bits. The number of rounds to be performed (n) may be 1, 10, 12 or 14. AES micro operations perform n rounds of AES accordingly based on the value of n. With a number of rounds value of 10, 12, 14, the aes micro operations may perform the current standard aes for key sizes 128-bits, 192-bits or 256-bits. The operation to be performed may be to encrypt or to decrypt. The special last round may be true or false. By allowing the type of round to be programmable an AES-like cipher with 20 rounds (with an AES-style last round), or only a "one round" pass may be performed using the same aes instruction and aes micro operations.

An aes round includes micro operations for the following stages: block state 314, s-box/inverse s-box 316, shift rows 316 and mix inverse, mix columns or null 320. The aes round performs the following:

In block state 314, the 128-bit input (state) to the aes round is added with a round key (128-bit portion of the expanded key associated with the round) using bitwise XOR to produce a 128-bit intermediate value (state).

In the S-box/inverse S-box 316, each byte of this 128-bit intermediate value is substituted with another byte value that can be stored and retrieved from a lookup table also referred to as a substitution box or "S-Box". The S-box takes some number of input bits, m, and transforms them into some number of output bits, n and is typically implemented as a lookup table. A fixed lookup table is typically used. This operation provides non-linearity through the use of the inverse function over Galois Field (GF)($2^8$). For example, the n-bit output may be found by selecting a row in the lookup table using the outer two bits of the m-bit input, and selecting the column using the inner bits of the m-bit input.

In Shift Rows 318, the results from S-box/inverse S-box 316 passes through a bit-linear transform in which bytes in each row of the 4×4 array (state) received from the Sub Bytes stage are shifted cyclically to the left. The number of places each byte is shifted differs for each row in the 4×4 array.

In Mix Columns 320, the results from Shift Rows 320 passes through a bit-linear transform in which each column of the 4×4 array (state) is treated as a polynomial over a binary Galois Field (GF)($2^8$) and is then multiplied modulo $x^4+1$ with a fixed polynomial $c(x)=3x^3+x^2+x+2$.

A last aes round differs from the other aes rounds in that it omits the fourth stage, that is, Mix Columns.

An exclusive OR (XOR) logic 324 after the Mix Columns stage 320 performs an exclusive OR function on the round key from the expanded key and the result of the aes round.

The following aes macro instruction may be issued to perform aes encryption using a 128-bit key based on aes FIPS Publication 197:

```
REG[i] = aes(REG[j],
            key-size = 128,
            #rounds = 10,
            op = encrypt,
            special_last_round = true)
```

The 128-bit Key is stored in register 0 308 in the register file 304 prior to the issue of the aes instruction. The parameters, that is, 128, 10, encrypt, true are stored in the control register 322 for use by each aes round. The aes instruction performs 10 aes rounds. With special last round set to 'true', the mix column transform stage 320 of the aes round is skipped on the last round, that is, round 10.

For example, the following aes instruction may be issued to perform aes decryption using a 192-bit key based on aes FIPS Publication 197:

```
REG[i] = aes(REG[j],
            key-size = 192,
            #rounds = 12,
            op = decrypt,
            special_last_round = true)
```

The 128 Least Significant Bits (LSBs) of the Key are stored in register 0 308 in the register file 304 and the 64 Most Significant Bits (MSBs) of the 192-bit Key are stored in register 1 310 of the register file 304 prior issuing the aes instruction. The special last round is set to 'true' to indicate that the inverse mix column transform stage 320 of the aes round is to be skipped on the last round, that is, round 12. This assumes that the inverse code to perform decryption takes the same form as encryption.

As the number of rounds parameter may be configured as '1', this allows a separate aes instruction to be issued for each aes round. Thus, instead of just performing a standard number of aes rounds based on key size, a non-standard number of rounds may be performed.

Instead of issuing one aes instruction to perform the standard number of rounds for a particular key size, a separate aes instruction may be issued for each round, as shown below in Table 1.

TABLE 1

```
REG[j] = REG[j] ^ K
For (i = 1 thru 9){
Load REG[0] = K[i];
REG[j] = aes(REG[j],
            key-size =128,
            #rounds=1,
            op=encrypt,
            special_last_round=false)
}
Load REG[0] = K[10];
REG[j] = aes(REG[j],
            key-size=128,
            #rounds=1,
            op=encrypt,
            special_last_round=true)
```

This example performs a 128-bit AES encrypt with a key whose expanded key is represented as {K[1], K[2], . . . K[10]}. The number of rounds is selected to be '1'. The round key (portion of the expanded key) is loaded into a register in the register file prior to issuing the aes instruction for each aes round. This avoids the need for an on-the-fly key scheduler 300 to be included in the general purpose processor 101 to generate the expanded key from the key. Instead a key scheduler to generate the expanded key from the key may be implemented in software and each portion of the expanded key (round key) may be loaded into the registers prior to each iteration of the loop that issues the aes instruction for a single aes round.

When the aes instruction has the parameter for the number rounds set to '1', the temporary key registers 324, 326 are bypassed and the round key is loaded directly into the block state 314.

In this example, as the portion of the expanded key (round key) for the round is input directly from the register file 304, an XOR instruction is issued to perform the XOR operation prior to entering the loop for performing the aes round by issuing a separate aes instruction for each aes round.

Through the use of the single round aes instruction, the aes instruction may be used to generate variants of AES with different number of rounds and key schedules, that is, variants of AES not defined by FIPS Publication 197. Thus, the single round option provides a flexible aes instruction.

In this embodiment the logic performs one aes round and may be implemented as a hardware state machine sequence. In another embodiment, the logic may be partially implemented as a micro-program stored in a Read Only Memory (ROM).

In this embodiment, 10 general purpose registers are used to store the expanded key. Although general purpose processors may include 16 general purpose registers, other embodiments may reduce the number of general purpose registers used to less than 10. For example, in another embodiment, load instructions are issued to load a set of round keys of the expanded key stored in memory into the general purpose registers. For example, 4 general purpose registers XMM[4:0] may be used to store a subset of the expanded key that is stored in memory. Load instructions are issued to load XMM[2:3] registers from memory while reading registers XMM[1:0] and read/write pointers move in lock-step modulo 4. This provides better usage of the register file while trading off load and memory operations.

Figure 4A:
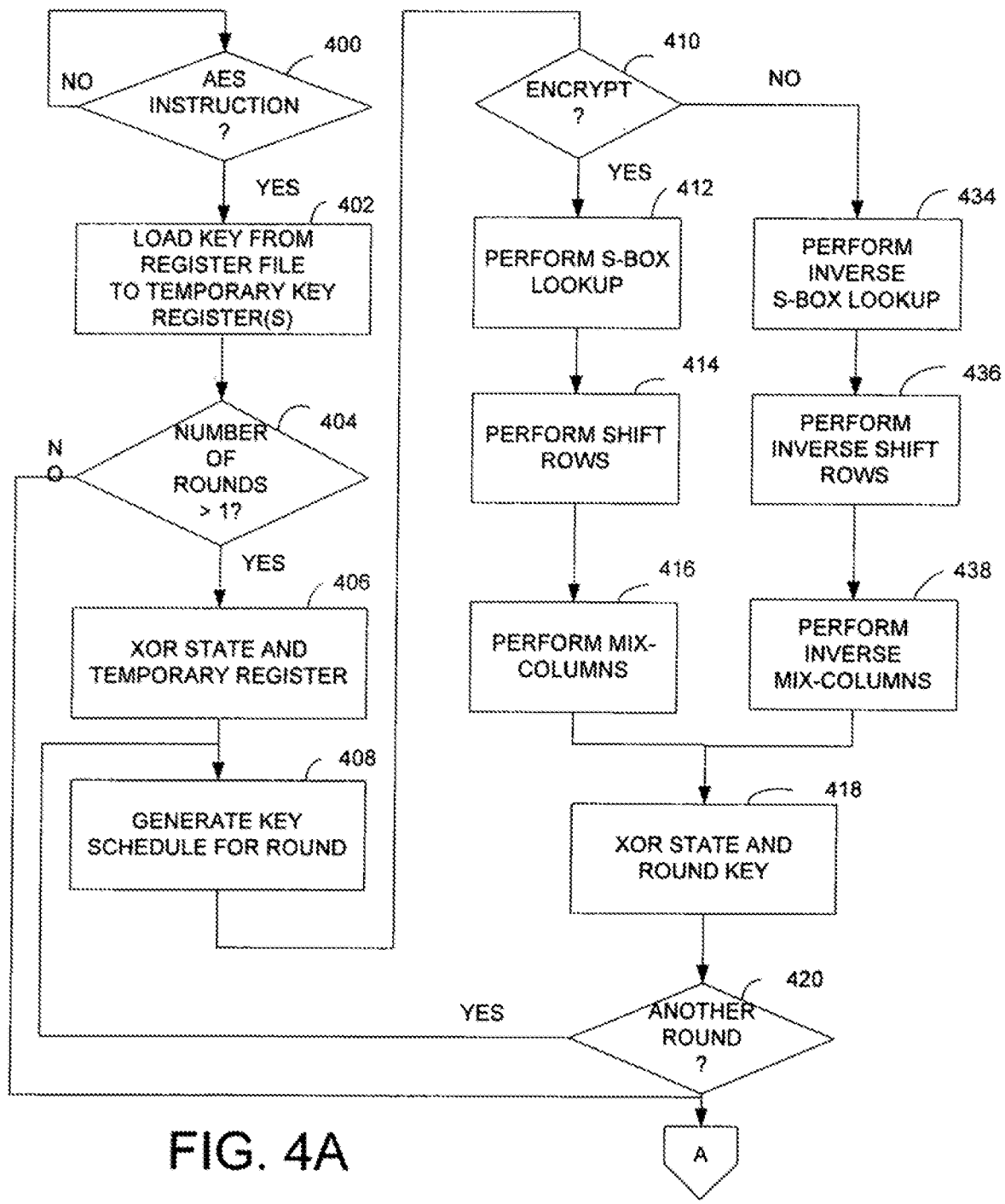
FIGS. 4A-4B is a flow graph illustrating the flow of an AES instruction through the execution unit shown in FIG. 3.
Figure 4B:
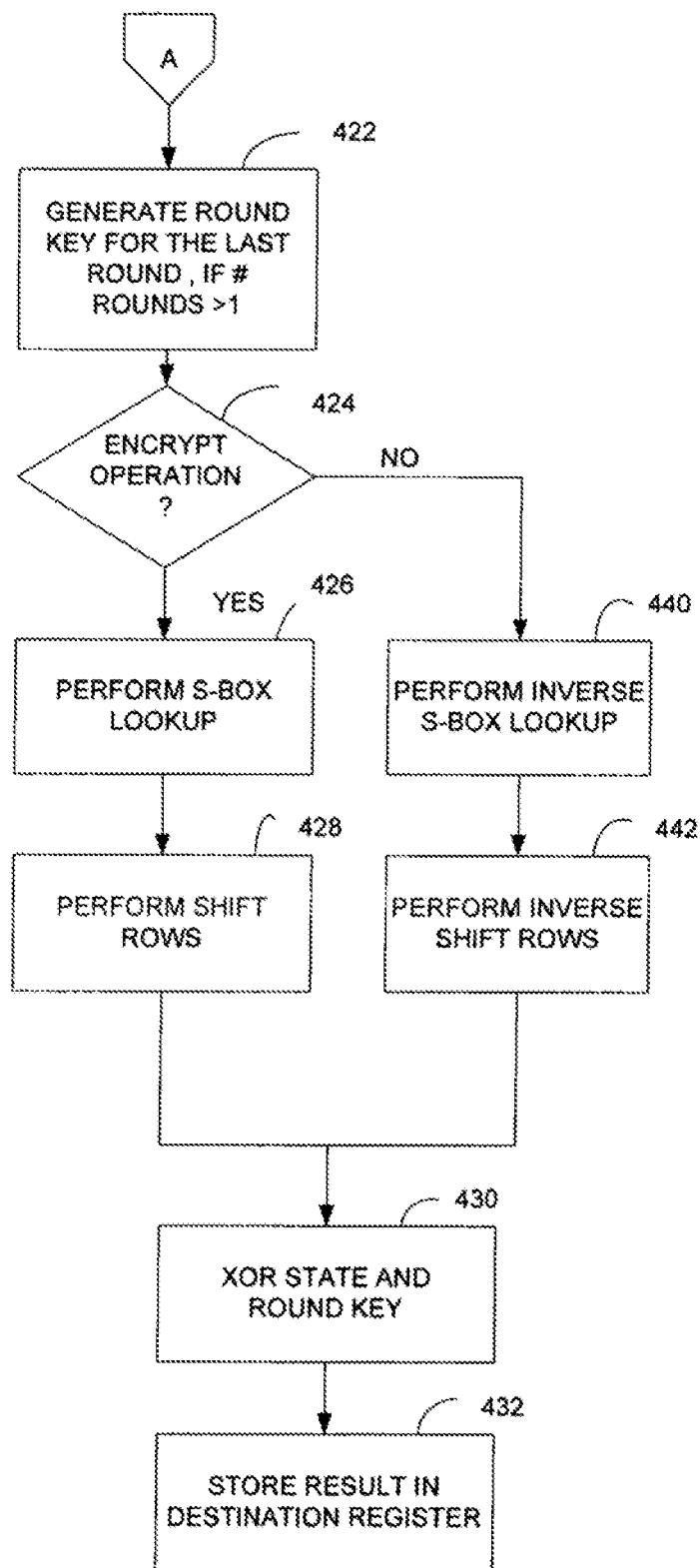

FIGS. 4A-4B is a flow graph illustrating the flow of an aes instruction through the execution unit shown in FIG. 3.

At block 400, the execution waits for an aes instruction. In one embodiment in a general purpose processor with a register file having a plurality of 128-bit registers, the AES instruction has the following format:

```
REG[dest] = aes(REG[src],
        key-size={128, 192, 256},
        #rounds={1,10,12,14},
        op={encrypt/decrypt},
        special_last_round={true/false} )
```

If an AES instruction has been decoded by the fetch and decode unit 206, processing continues with block 402. If not, processing remains in block 400 waiting for an aes instruction.

At block 402, during the instruction decode by the fetch and decode unit 206, the key size (key-size), the number of rounds (#rounds), operation (op) and special last round parameters (special_last_round) are stored in the control register 322 for use in performing the operations associated with the aes instruction. For example, in one embodiment, fields (key_size, mds, op, use_NULL_col) in the control register (C_reg) store the following parameters for the AES instruction:

C_reg.key_size=key_size;
C_reg.rnds=rounds;
C_reg.op=op;
C_reg.use_NULL_col=special_last_round;

The key size parameter stored in the control register 322 is used to determine which register(s) 308, 310 in the register file 304 store the key. In an embodiment, if the key size is 128-bits the key is stored in register 0 308 and if the key size is greater than 128-bits, the key is stored in register 0 308 and register 1 310. Dependent on the key size, the key is loaded from the register(s) 308, 310 in the register file 304 to the temporary key register(s) 324, 326 in the execution unit 210 for use by the aes instruction. Processing continues with block 404.

At block 404, if the number of rounds parameter (c_reg.rnds) is greater than 1, processing continues with block 406. If not, processing continues with block 422 to process the last round (that is, round 10, 12, 14 or 1).

At block 406, the 128-bit input (state) to the round is added with the temporary key (128-bit key) using bitwise XOR to produce a 128-bit intermediate value (state). The result of the XOR operation is stored as the 128-bit block state. As the initial state used by the first round is stored in the source register 306 in the register file, the first round performs the XOR operation using the state loaded from the source register 306. Processing continues with block 408.

At block 408, the on-the-fly scheduler 300 computes a round key for the round from the stored in the temporary register(s) 324, 326. Processing continues with block 410.

At block 410, a determination is made as to whether the operation to be performed by the aes instruction is encrypt or decrypt based on the state of the encrypt/decrypt parameter stored in the control registers. If the operation is to encrypt, processing continues with block 412. If the operation is to decrypt, processing continues with block 434.

At block 412, a substitution operation is performed on the 128-bit block state that is, the result from block 406 or 418. Each byte of the 128-bit block state is substituted with another byte value that can be stored and retrieved from a lookup table also referred to as a substitution box or "S-Box". The S-box takes some number of input bits, m, and transforms them into some number of output bits, n and is typically implemented as a lookup table. The result is stored as a 128-bit block state. Processing continues with block 414.

At block 414, the 128-bit block state (4×4 array) passes through a bit-linear transform in which bytes in each row of the 4×4 array are shifted cyclically to the left. The number of places each byte is shifted differs for each row in the 4×4 array. Processing continues with block 416.

At block 416, the 128-bit block state (4×4 array) passes through passes through a bit-linear transform in which each column of the 4×4 array (state) is treated as a polynomial over $GF(2^8)$ and is then multiplied modulo $x^4+1$ with a fixed polynomial $c(x)=3x^3+x^2+x+2$. Processing continues with block 418.

At block 418, the 128-bit block state input to the next round is added to the 128-bit schedule generated for the next round using bitwise XOR to produce a 128-bit block state. Processing continues with block 420.

At block 420, if there is another round to be processed which is not the last round, processing continues with block 408. The number of rounds to be processed is based on the total number of rounds to be processed stored in the control register and the number of rounds already completed. If all rounds except the last round have been completed, processing continues with block 422 to process the last round.

At block 422, the on-the-fly key scheduler 300 generates the round key from the key stored in the temporary key for the last round of an aes instruction for 10, 12 or 14 rounds. Processing continues with block 424.

At block 424, if the operation stored in the control register for the aes instruction decoded by the instruction decoder is encryption, processing continues with block 426. If not, processing continues with block 440 to perform decryption.

At block 426, an S-box lookup is performed for the last round in a similar manner to the S-box lookup discussed in conjunction with block 412. Processing continues with block 428.

At block 428, a shift rows operation is performed for the last round in a similar manner to that discussed in conjunction with the other rounds in block 414. Processing continues with block 430.

At block 430, the bock state result from block 428 is added to the 128-bit key schedule generated for the last round (10, 12 or 14) or one round (if the number of rounds is one) using bitwise XOR to produce a 128-bit block state. Processing continues with block 432.

At block 432, the result of the encryption (or decryption) operation is stored in the destination register in the register file. Processing for the aes instruction is complete. Table 2 below shows an example of the result of performing AES encryption using a 128-bit key on a 128-bit block input.

TABLE 2

| 128-bit Input: | 00112233445566778899aabbccddeeff (Hexadecimal) |
| 128-bit Key: | 000102030405060708090a0b0c0d0e0f (Hexadecimal) |
| 128-bit Result: | 69c4e0d86a7b0430d8cdb78070b4c55a (Hexadecimal) |

At block 434, the operation to be performed is decryption. A substitution operation is performed on the 128-bit block state by performing an inverse s-box lookup as defined by the AES standard. Processing continues with block 436.

At block 436, an inverse shift rows operation is performed as defined by the AES standard. Processing continues with block 438.

At block 438, an inverse shift rows operation is performed as defined by the AES standard. Processing continues with block 418.

At block 440, the operation to be performed is decryption. A substitution operation is performed on the 128-bit block state for the last round by performing an inverse s-box lookup as defined by the AES standard. Processing continues with block 442.

At block 442, an inverse shift rows operation is performed for the last round as defined by the AES standard. Processing continues with block 430.

In one embodiment, the blocks in the flowgraph of FIGS. 4A and 4B may be implemented as a hardware state machine sequence. In another embodiment portions of the blocks may be implemented as a micro-program that may be stored in Read Only Memory (ROM). The embodiment in which the blocks are implemented as a hardware state machine sequence may provide higher performance.

In another embodiment, support for the standard aes numbers of rounds, that is, 10, 12, 14 may only be provided. However, support for performing one round as discussed in the embodiment in FIGS. 4A-4B may be provided by a "dormant option". For example, for any number of rounds requested other than the standard aes number of rounds, that is, 10, 12, 14, a no operation (no-op) is performed. Thus, the interface is ready to support other numbers of rounds, if required for future encryption/decryption standards. For example, if new standards for hashing or MAC-ing, attacks on AES are introduced, support for different numbers of rounds may be easily added.

In yet another embodiment, microcode may be used to implement rounds that are less than the aes standard number of rounds.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A processor comprising:
   a plurality of cores;
   a level 1 (L1) instruction cache to store instructions, including a Single Instruction Multiple Data (SIMD) Advanced Encryption Standard (AES) round instruction;
   a level 1 (L1) data cache to store data;
   instruction fetch circuitry to fetch the instructions from the L1 instruction cache;
   decode circuitry to decode the SIMD AES round instruction that is to be used to perform only a single round of an AES cryptographic operation, wherein the SIMD AES round instruction has an encrypt/decrypt parameter dedicated to specification of whether either one of a single AES decryption round, or a single AES encryption round, is to be performed;
   a Read Only Memory (ROM) to store micro operations for the SIMD AES round instruction;
   a first 128-bit source register to store input data to be decrypted or encrypted by the single round of the AES cryptographic operation dependent upon the encrypt/decrypt parameter;
   a second 128-bit source register to store a round key to be used for the single round of the AES cryptographic operation; and
   an execution circuit including AES execution circuitry to execute the micro operations for the SIMD AES round instruction to perform only the single round of the AES cryptographic operation, the single round of the AES cryptographic operation to operate on the input data from the first 128-bit source register using the round key from the second 128-bit source register, and to store a result of the single round of the AES cryptographic operation in a destination storage location, the single round of the AES cryptographic operation to include either an inverse mix columns transform for the single AES decryption round or a mix columns transform for the single AES encryption round.

2. The processor of claim 1, wherein the single round of the AES cryptographic operation is to further include an inverse byte substitution transform for the single AES decryption round or a byte substitution transform for the single AES encryption round.

3. The processor of claim 2, wherein the single round of the AES cryptographic operation is to further include an inverse shift rows transform for the single AES decryption round or a shift rows transform for the single AES encryption round.

4. The processor of claim 2, wherein the inverse byte substitution transform comprises a substitution of one or more bytes using data retrieved from an inverse substitution table.

5. The processor of claim 2, wherein a result of the inverse byte substitution transform comprises an array of substituted data.

6. The processor of claim 3, wherein the inverse shift rows transform is to shift data in each row of a first array by a specified amount to produce a second array.

7. The processor of claim 1 further comprising a scheduler to schedule operations to be executed by the processor.

8. The processor of claim 1, wherein the decode circuitry is to decode the SIMD AES round instruction into the micro operations to be processed by the execution circuit to execute the single round of the AES cryptographic operation.

9. The processor of claim 1, further comprising a retirement unit.

10. The processor of claim 1, further comprising key generation logic to generate the round key.

11. The processor of claim 1, wherein the SIMD AES round instruction has a parameter to specify whether or not the single round is a last round.

12. The processor of claim 1, wherein the processor is a general-purpose processor, wherein the first 128-bit source register comprises an XMM register, wherein the SIMD AES round instruction has a parameter to specify whether or not the single round is a last round, and further comprising key generation logic to generate the round key.

13. A processor comprising:
a plurality of cores, including a first core comprising:
a level 1 (L1) instruction cache to store instructions;
a level 1 (L1) data cache to store data;
a decoder to decode the instructions, including a Single Instruction Multiple Data (SIMD) Advanced Encryption Standard (AES) round instruction that is to be used to perform only a single round of an AES cryptographic operation, wherein the SIMD AES round instruction has an encrypt/decrypt parameter dedicated to specification of whether a single AES decryption round, or a single AES encryption round, is to be performed;
a Read Only Memory (ROM) to store micro operations for the SIMD AES round instruction;
a first 128-bit source register to store input data to be decrypted or encrypted by the single round of the AES cryptographic operation according to the encrypt/decrypt parameter;
a second 128-bit source register to store a round key to be used for the single round of the AES cryptographic operation;
a scheduler to schedule operations to be executed; and
an execution unit to execute the micro operations for the SIMD AES round instruction to perform only the single round of the AES cryptographic operation, the single round of the AES cryptographic operation to process input data from the first 128-bit source register using the round key from the second 128-bit source register, and to store a result of the single round of the AES cryptographic operation in a set of registers that include the first and second 128-bit source registers, the single round of the AES cryptographic operation to include either an inverse mix columns transform in the case of the single AES decryption round or a mix columns transform in the case of the single AES encryption round.

14. The processor of claim 13, wherein the execution unit includes AES circuitry, and wherein the single round of the AES cryptographic operation is to further include an inverse byte substitution transform in the case of the single AES decryption round or a byte substitution transform in the case of the single AES encryption round.

15. The processor of claim 14, wherein the single round of the AES cryptographic operation is to further include an inverse shift rows transform in the case of the single AES decryption round or a shift rows transform in the case of the single AES encryption round.

16. The processor of claim 14, wherein the inverse byte substitution transform comprises a substitution of one or more bytes using data retrieved from an inverse substitution table.

17. The processor of claim 14, wherein a result of the inverse byte substitution transform comprises an array of substituted data.

18. The processor of claim 13, further comprising a retirement unit.

* * * * *